(No Model.) 8 Sheets—Sheet 4.
G. W. LE VIN.
SUBTERRANEAN ELECTRIC LINE SYSTEM.
No. 370,955. Patented Oct. 4, 1887.
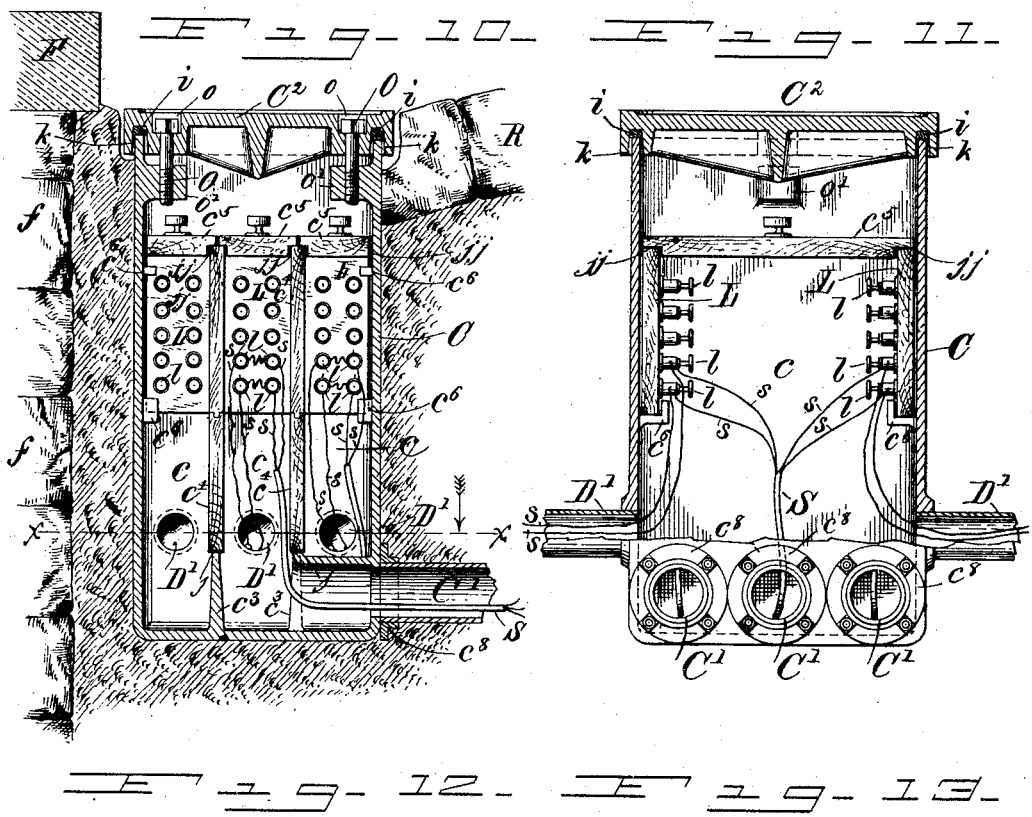
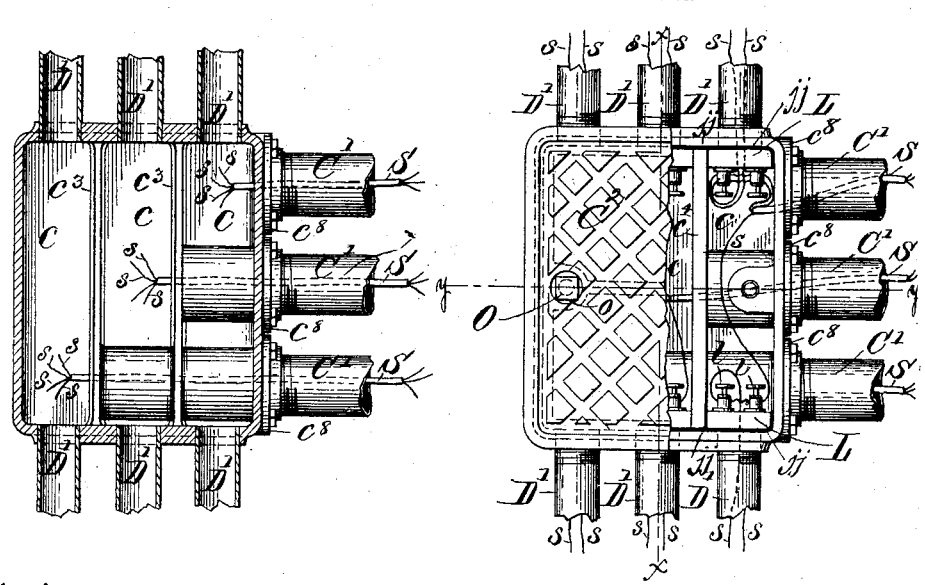
Witnesses.
Henry Frankfurter
L. Purie Levin
Inventor.
George W. Le Vin.

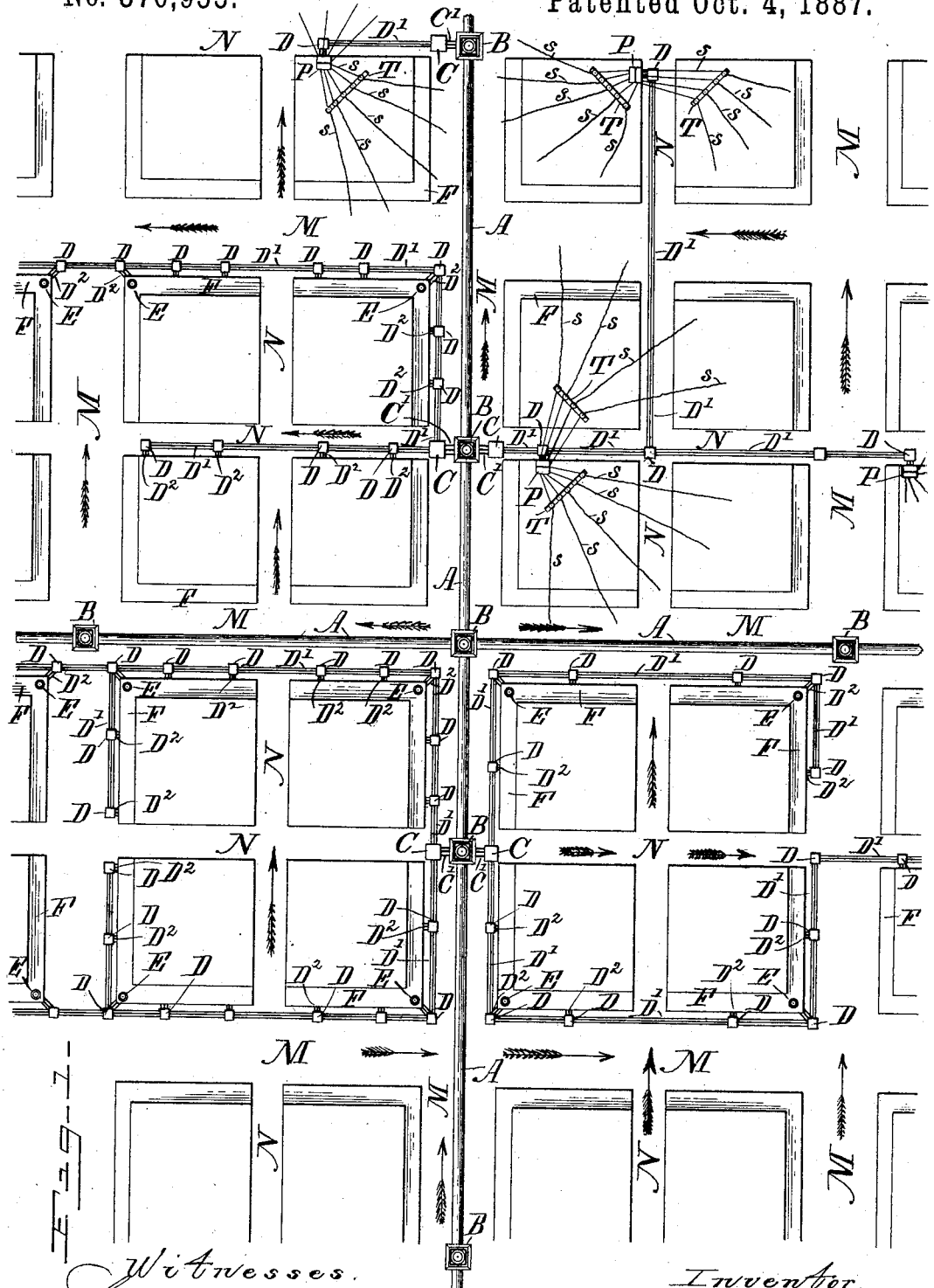

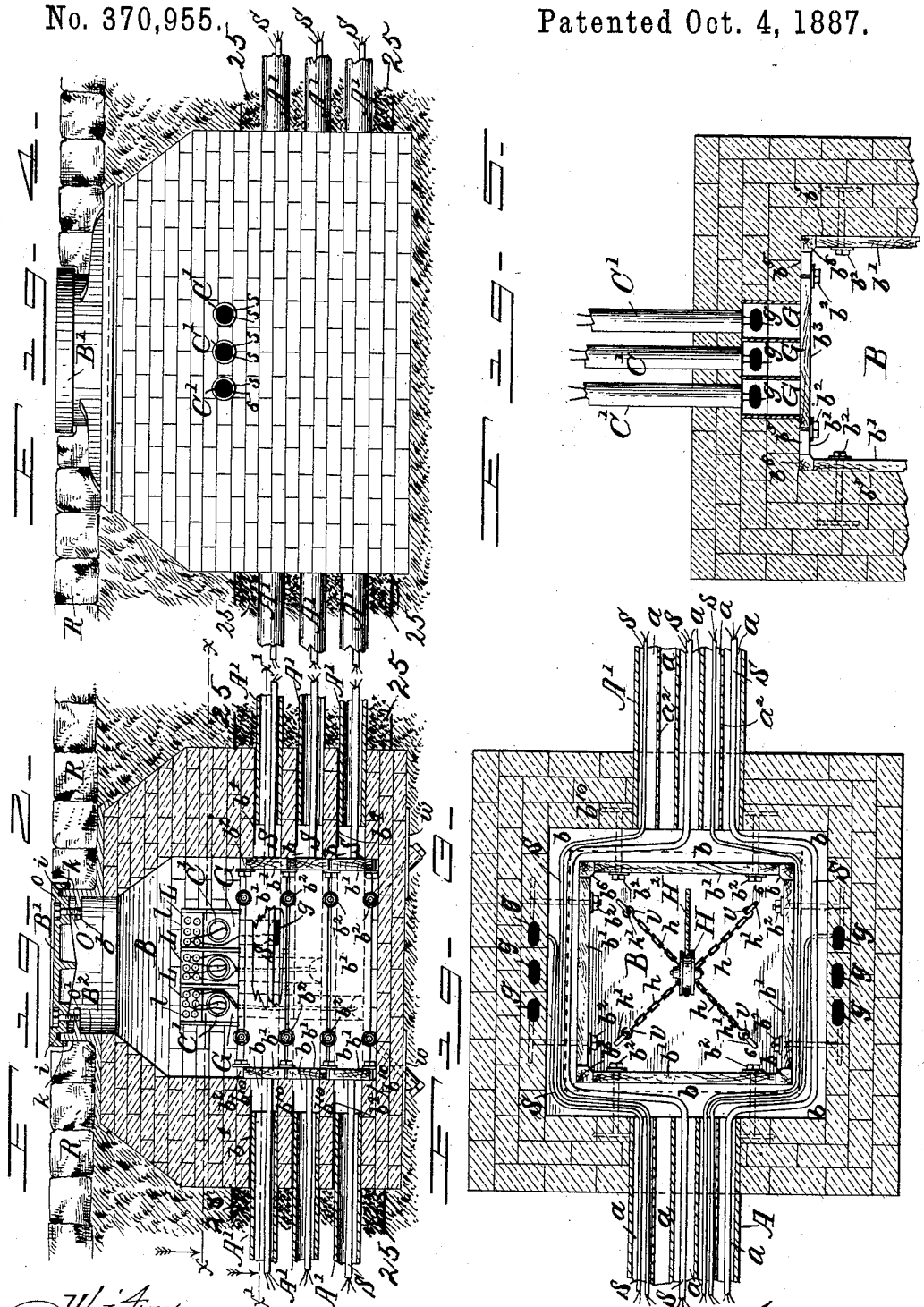

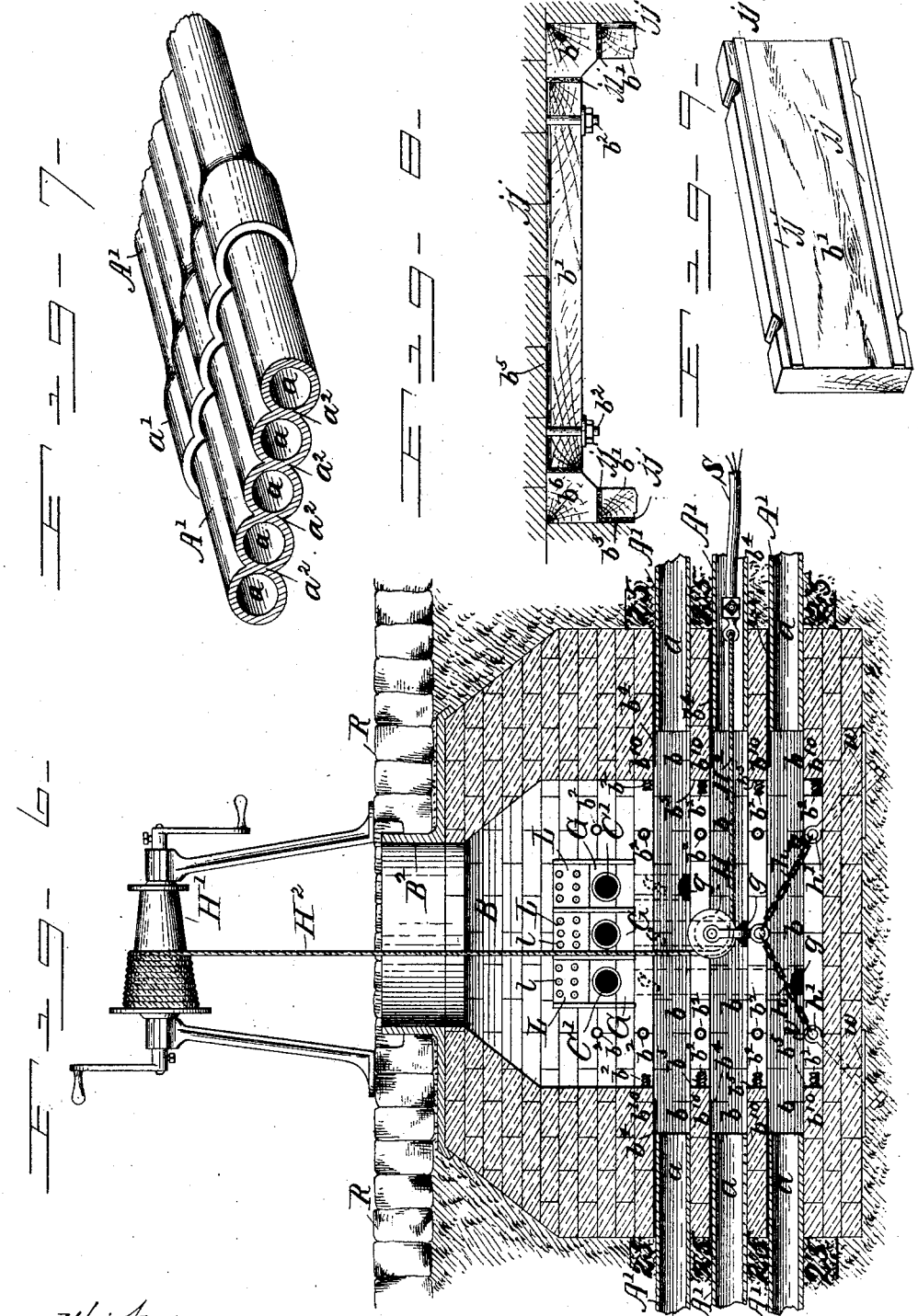

(No Model.) 8 Sheets—Sheet 5.
G. W. LE VIN.
SUBTERRANEAN ELECTRIC LINE SYSTEM.
No. 370,955. Patented Oct. 4, 1887.
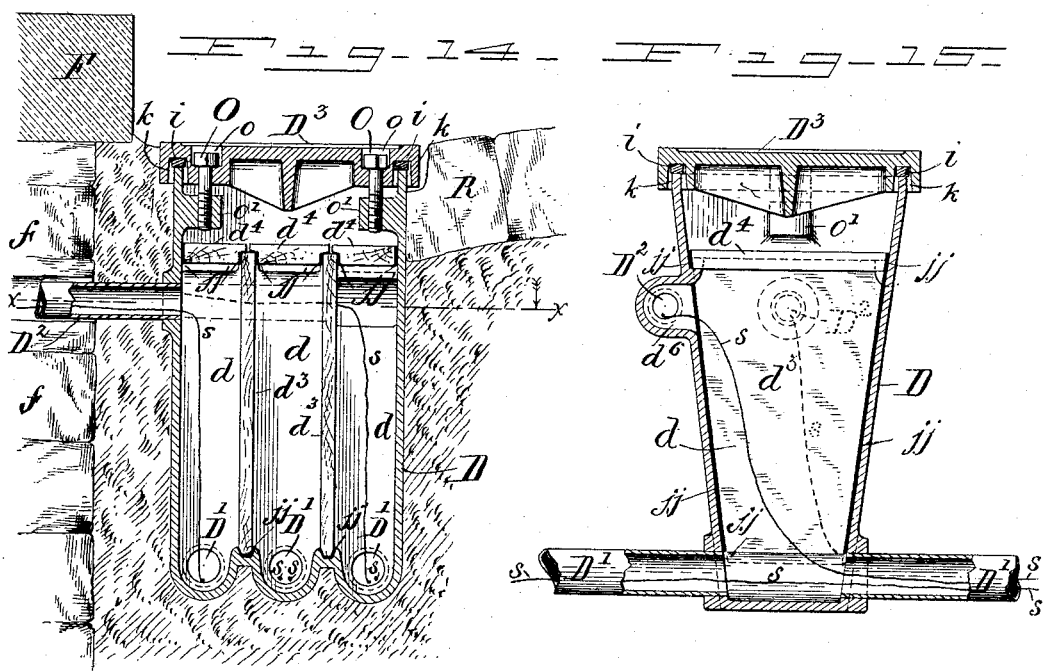
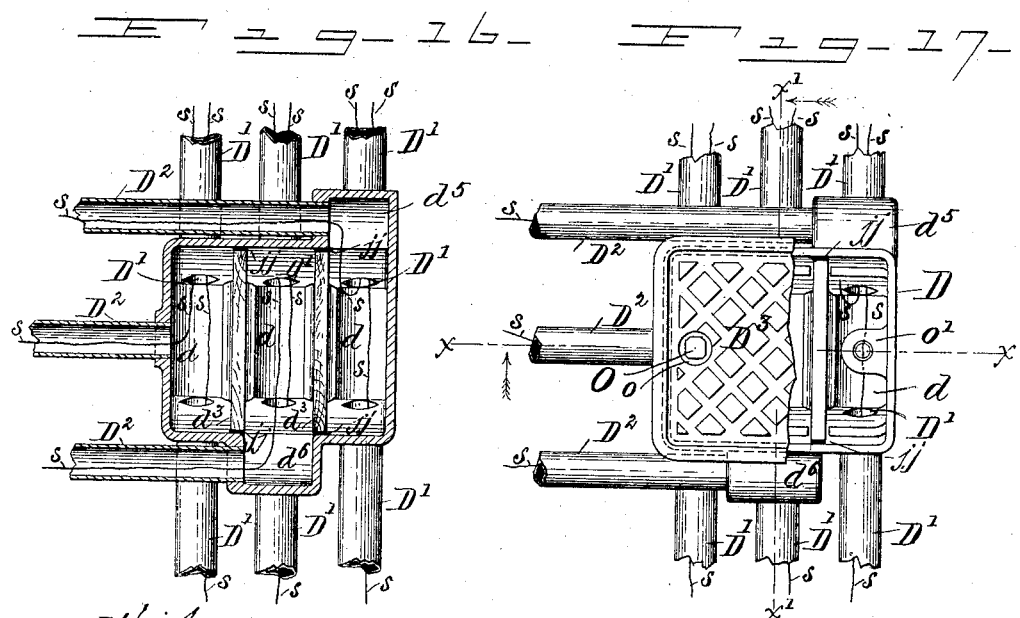

(No Model.) 8 Sheets—Sheet 6.
G. W. LE VIN.
SUBTERRANEAN ELECTRIC LINE SYSTEM.
No. 370,955. Patented Oct. 4, 1887.
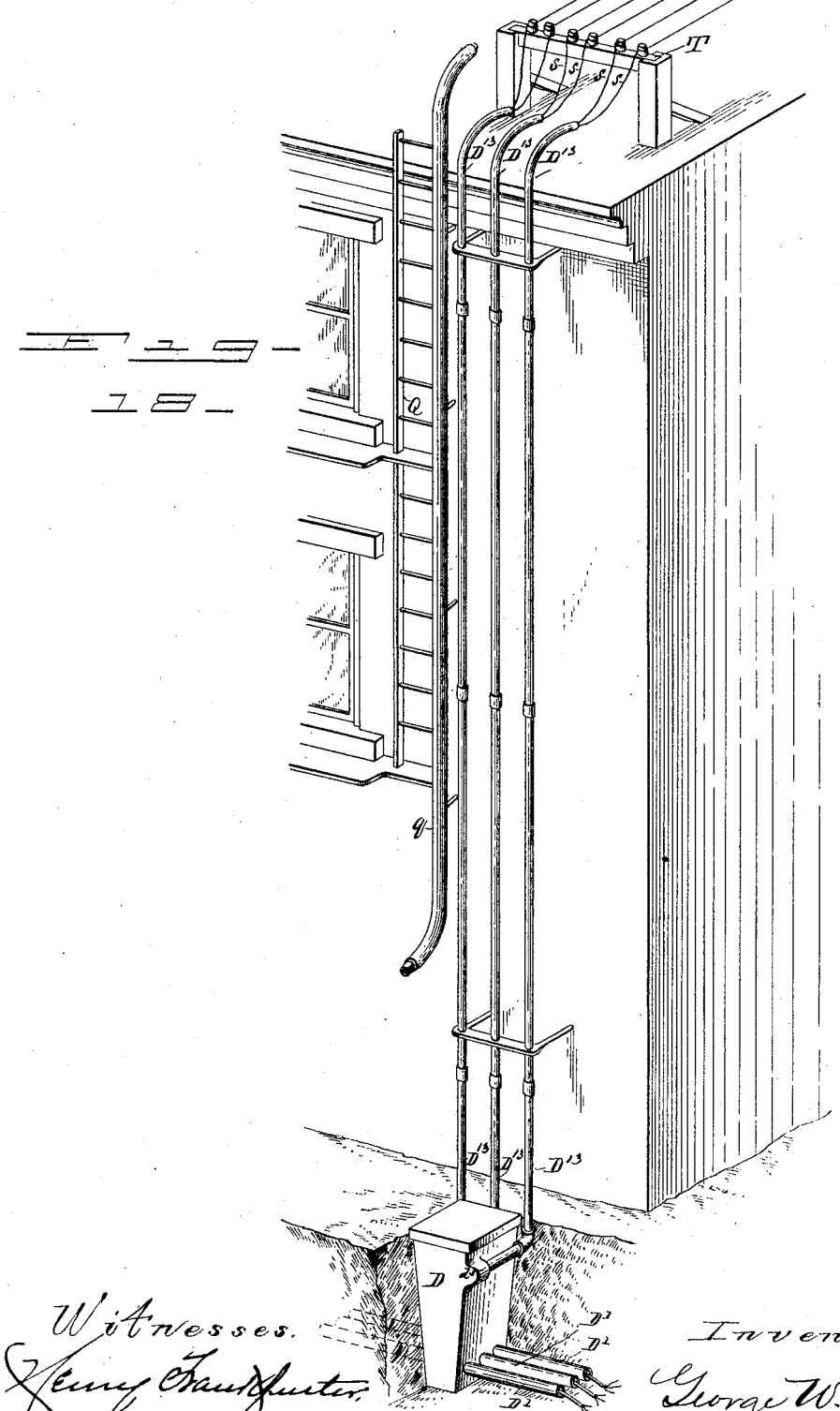
Witnesses. Inventor.
George W. Le Vin.

(No Model.)　　　　　　　　　　　　　　8 Sheets—Sheet 7.
G. W. LE VIN.
SUBTERRANEAN ELECTRIC LINE SYSTEM.
No. 370,955.　　　　　　　　　Patented Oct. 4, 1887.
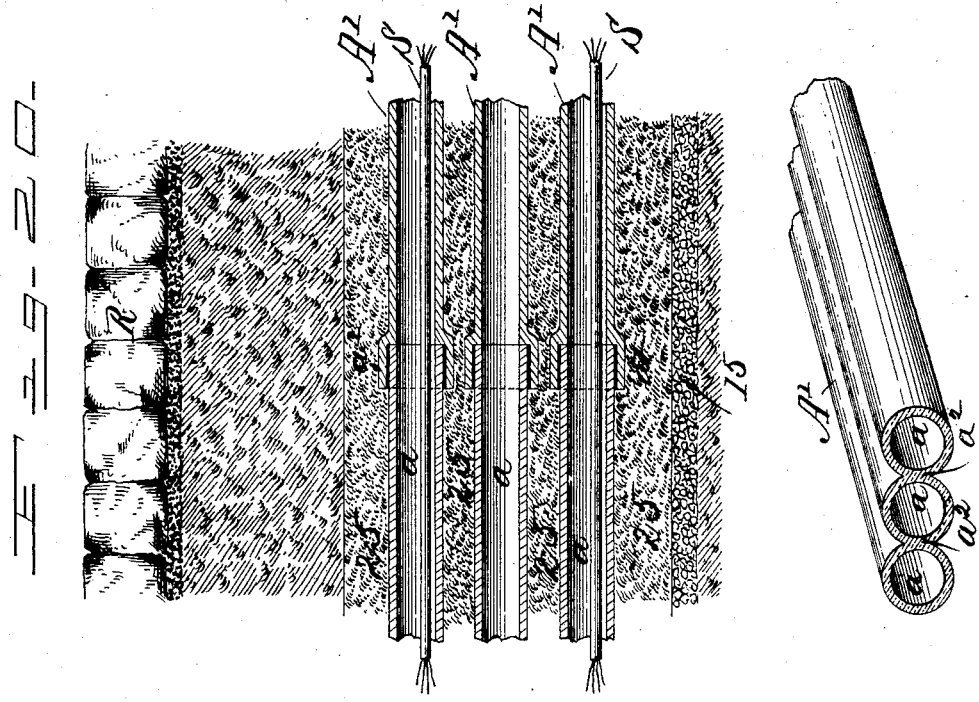
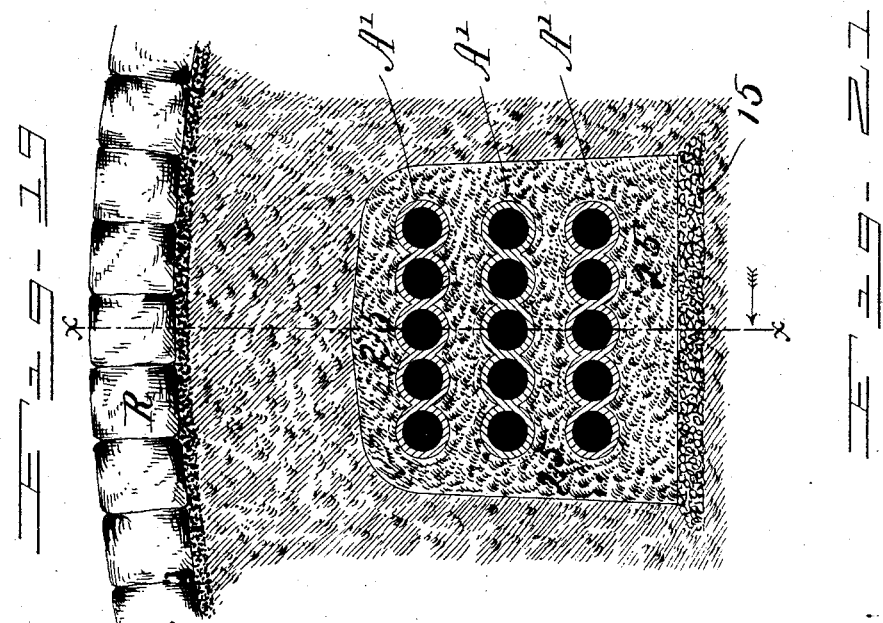
Witnesses.　　　　　　　　　　Inventor.
　　　　　　　　　　　　　　　George W. LeVin.

(No Model.) 8 Sheets—Sheet 8.
G. W. LE VIN.
SUBTERRANEAN ELECTRIC LINE SYSTEM.
No. 370,955. Patented Oct. 4, 1887.
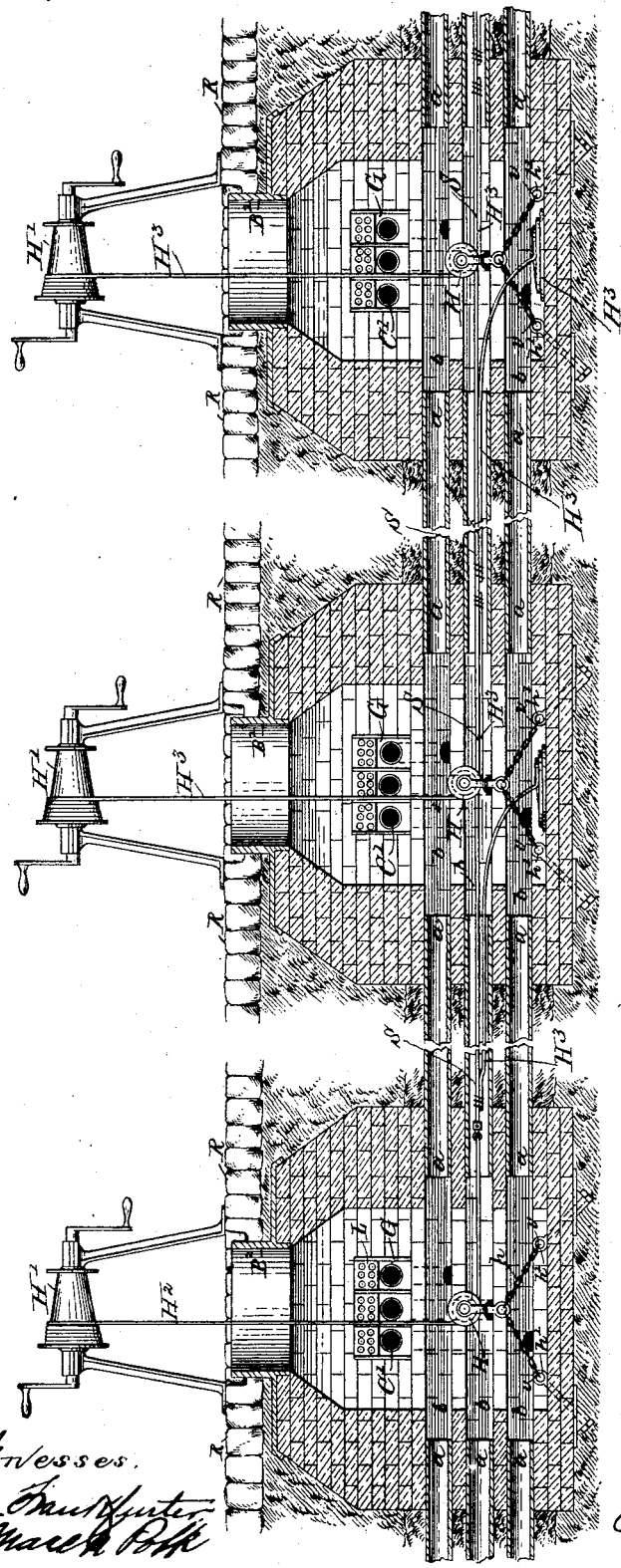
Witnesses.
Inventor.
George W. Le Vin.

UNITED STATES PATENT OFFICE.

GEORGE W. LE VIN, OF CHICAGO, ILLINOIS, ASSIGNOR TO HORATIO N. MAY, OF SAME PLACE.

SUBTERRANEAN ELECTRIC-LINE SYSTEM.

SPECIFICATION forming part of Letters Patent No. 370,955, dated October 4, 1887.

Application filed February 21, 1887. Serial No. 228,328. (No model.)

*To all whom it may concern:*

Be it known that I, GEORGE W. LE VIN, a citizen of the United States, residing at Chicago, in the county of Cook and State of Illinois, have invented certain new and useful Improvements in Subterranean Electric-Line Systems, of which the following is a full, clear, and exact description, reference being had to the accompanying drawings, and to the letters of reference marked thereon, which form part of this specification.

My invention relates to matters of improvement in the construction and operative arrangement, collectively and otherwise, of the conduit, vaults or man-holes, junction-boxes, hand-holes, wire-distributing devices, cable-hauling-through devices, and the other auxiliaries or accessories essential to a properly-appointed subterranean electric-line system, the same consisting in the matters hereinafter particularly set forth, and pointed out in the appended claims.

In the accompanying drawings, Figure 1 is a plan view or diagram substantially showing the operative arrangement of my system; Fig. 2, a vertical central section taken through the vault or man-hole B and the pipes A' of the conduit; Fig. 3, a horizontal section of the vault or man-hole B and pipes A', taken on the line X' X' of said Fig. 2; Fig. 4, a side elevation of said vault or man-hole and pipes; Fig. 5, a horizontal sectional detail of part of the vault or man-hole B, taken on the line X X of said Fig. 2; Fig. 6, an enlarged central vertical section of the vault or man-hole B, showing its internal arrangement, also particularly showing the cable-hauling-through devices and the manner of their employment; Fig. 7, a perspective view of conjoining sections of the pipe A', of which the conduit is composed; Figs. 8 and 9, plan and perspective details, respectively, showing the operative arrangement and construction of the doors which are employed for closing the compartments $b$, formed within the vault B; Fig. 10, a central vertical section of the junction-box C, in operative location adjacent the retaining-wall of the sidewalk, taken on the line Y Y of Fig. 13; Fig. 11, a vertical section (the lower part being in elevation) of said junction-box, taken on the line X X of Fig. 13; Fig. 12, a horizontal section of said junction-box, taken on the line X X of said Fig. 10; Fig. 13, a plan view of said junction-box, with its cover $C^2$ in part broken away; Fig. 14, a vertical section of the hand-hole D, in operative location adjacent the retaining-wall of the side-walk, said view being taken on the line X X of Fig. 17; Fig. 15, a vertical section of said hand-hole, taken on the line X' X', looking in the direction indicated by the arrow shown at the upper end of said Fig. 17; Fig. 16, a horizontal section of said hand-hole, taken on the line X X of said Fig. 14; Fig. 17, a plan view of said hand-hole, with its cover $D^3$ in part broken away; Fig. 18, a perspective view substantially illustrating the devices which I employ for conveying service-wires overhead from the underground ducts of the system and for distributing the same at such point; Figs. 19 and 20, details showing in transverse and longitudinal section, respectively, the manner in which the pipes A' of the conduit are fixed in operative position below the ground-level; Fig. 21, a detail showing the preferable construction of the pipe A' with reference to the number of ducts $a$ embodied within the same. Fig. 22 is a detail in vertical section taken longitudinally through the center of a series of vaults and the conduit-main, particularly illustrating the manner of employing the cable-hauling devices in the system.

By reference to the plan view, Fig. 1, which generally outlines the features of my system, it will be seen that at suitable intervals throughout the length of the conduit A are located vaults B. From these vaults laterally project pipes C', which connect with junction-boxes C, located adjacent the sidewalks F at or about the points of intersection with the alleys N of the street M. From said junction-boxes extend pipes D', which intersect hand-holes D, which are located parallel with and adjacent the outer lines of the sidewalk F or within the alley N. From certain of said hand-holes pipes $D^2$ are projected into the basement of each building (none being shown in said figure) to which it is desired to furnish electric service; also in certain instances connecting with electric-lamp posts E, shown at the street-corners. Certain other of said hand-holes located within the alleys N connect each with the devices indicated by the letter P, employed for overhead distribution of the service-wires s.

To describe in detail the construction and operative arrangement of my said improvements, the conduit A is composed of pipes A', preferably integrally multitubular, and desirably formed of vitrified clay or other substance of a kindred nature capable of withstanding the deteriorating action of acids and alkalies, and of practically protecting the wires or cables contained therein against the earth-currents.

The tubes $a$, which are preferably cylindrical, are made in horizontal series, as shown particularly in Fig. 7, and are isolated from each other by means of the web $a^2$, formed by the material constituting the sides of contiguous tubes or ducts. Being necessarily manufactured in sections of convenient length for handling and baking, each section is provided at one end with a socket, $a'$, adapted to receive and hold in position the barrel end of the conjoining section, which is additionally secured in position within said socket, when laid, and the joint thus formed rendered moisture-tight by the employment therein or thereabout of a suitable cementitious compound.

Inasmuch as fissures in the web $a^2$ and other imperfections are likely to result from unequal shrinkage in the process of baking the clay, and as such imperfect sections would be unfit for employment in the system, I prefer to embody but three ducts in each section A', as shown in Fig. 24, thus reducing the loss in material in cases where the same would need to be rejected. In a system requiring large facilities for running underground wires and cables, as is represented in the accompanying illustrations, several of these lines of piping may be arranged in a horizontal series and several of such series located one above the other at a suitable distance below the ground-level, as indicated in Figs. 22 and 23, being thoroughly embedded in concrete 25, which practically converts the structure into a solid mass capable of resisting excessive crushing strains, the longitudinal stress incident to cable-hauling through the ducts, and the passage of water or moisture to the pipe-joints.

Broken stone 15, primarily located in the bottom of the excavation made for the conduit, forms a desirable bed upon which the mass of concrete is laid.

The vault B (shown in Figs. 2, 3, 4, and 6 as being formed mainly of brick) may be composed of any suitable material. It is provided interiorly with longitudinally-continuous recesses or compartments $b$, formed within or about the side wall thereof, into which the pipes A' enter, of a number suitable for the service required. Thus, for illustration, the number vertically of the horizontal series of pipes shown being three, and each of said series being intended to carry a class of wires or cables differing in electrical condition from the others, three of said longitudinal compartments $b$ are provided—to wit, one for each of said horizontal series. Within or about the side walls of said vault, from the interior thereof, are formed chambers G, (likewise being of a number suitable for the service required,) into which enter the pipes C', particularly shown in Figs. 2, 5, and 6. From each longitudinal compartment $b$ communication is had with a certain chamber, G, by means of a vertical passage, $g$, formed, preferably, in the wall, as shown. Within each chamber G a test-board, L, would ordinarily be located, and employed for the purpose of testing service-wires running from the vault, as hereinafter described. The compartments $b$ and chambers $g$ are provided with removable doors $b'$ $b^3$, which are designed to close the same effectually against the admission of moisture or gas. The preferred manner of securing said doors in position is by means of bolts and nuts $b^2$, the former being fixedly held in the material forming the upper and lower walls, $b^{10}$, of said compartments, and the latter working against the outer face of the door. To insure a perfect air-and-moisture-excluding connection between the doors $b'$ $b^3$ and the face $b^5$ of the walls, against which they are intended to work, said doors are provided with packing or closing strips $j$, of a plastic or elastic character. (Shown particularly in Figs. 8 and 9.) In order to facilitate the placing in position and removal of said doors $b'$, in each corner of the wall I place a removable mitered vertical piece, $b^6$, provided also with said closing-strip $j$, against which the ends of the doors close, as shown. The employment of the pieces $b^6$ is not essential to the proper locating and closing of the doors, however, as said doors may be provided with said closing-strip at their ends and caused to work sufficiently close to each other, and thereby form a satisfactory joint.

The reference-letter $b^4$ (seen in Figs. 2 and 6) indicates a sheet of wrought-iron, which extends around the full length of the compartment $b$, being provided for sustaining or reenforcing the overhanging wall thereof. The upper portion of said vault is provided with a cast-iron collar, B², which extends to or about the plane of the street-paving R.

The cover B' is provided on its under surface with downwardly-projecting double flanges, or a continuous recess, $k$, adapted to fit over the upper termination of said collar, being likewise provided with screw-bolts O, which, working in suitable threaded lugs $o'$, forming part of said collar, are the means which I employ for closing said vault. The recess $o$, in which the heads of said bolts are seen, protects the same from being injured by truck-wheels, &c., which would otherwise come in contact therewith. Within the recess $k$ of said cover packing $i$ is employed for thoroughly sealing the joint made by said cover and collar against the ingress to the vault of water or moisture or gases.

The junction-box C, (shown in Figs. 10, 11, 12, and 13,) which is preferably composed of cast-iron, is provided with compartments $c$, each of which has communication with a corresponding chamber, G, of the vault B by means of a connecting-pipe C'. These compartments (for convenience of construction) are formed by partition-plates $c^4$, preferably of wood, adapted to connect with webs $c^3$, which project upwardly from the floor of the box. Each of said compartments is ordinarily provided with a cover, $c^5$, as shown; but a single cover capable of properly closing the same may be substituted for such number. Where joints are formed by the partition-plates coming in contact with the box and web and covers or cover, a closing-strip, $j\ j$, is employed for the purpose of rendering the compartments air-and-moisture tight. From each of said compartments a separate pipe, D', is extended to connection with an adjacent hand-hole D. At each end of each compartment, as shown, or at one end, if preferred, test-boards L would ordinarily be employed for the purpose of testing service-wires distributed from the box, as hereinafter described. The cover $C^2$, for the same purpose and similarly after the manner of the vault-cover B', is provided with the downwardly-projecting double flanges or recess $k$, adapted to fit over the upper termination of said box, packing $l$, and screw-bolts O, which work in threaded lugs $o'$, forming part of the box C, the several jointing-surfaces forming a water-tight joint at the extrance to the box when the cover is fixed thereto.

The hand-hole D, (shown in Figs. 14, 15, 16, and 17,) which is also preferably composed of cast-iron, is provided with compartments $d$, substantially similar to the compartments shown in said junction-box, each one of said compartments, by means of pipes D', having communication with corresponding compartments of a junction-box and adjacent hand-hole, or with adjacent hand-holes. (Generally shown in Fig. 1.) From each of said compartments a service-pipe, $D^2$, or equivalent device is extended to the basement of the building to be supplied with wires, connection being also had in such manner below the ground or sidewalk level with the electric lamp E (shown in said Fig. 1) at the street-corner. The manner in which the pipes $D^2$ are connected with the several compartments $d$ shown in the several views is as follows: Two of said compartments are provided at opposite ends each with an outwardly-overhanging pocket, (respectively indicated by the reference-letters $d^5\ d^6$,) into each of which one of said pipes $D^2$ is fixedly entered. The pipe connecting with the other compartments enters the same at or about midway of its length. For convenience of construction removable partition-plates $d^3$, preferably of wood, are employed for designating the several compartments $d$, the whole being provided with individual covers $d^4$, as shown, or with a single cover suitable for thoroughly closing the same. These partition-plates and covers are also provided with the closing-strip $j\ j$ upon each surface, intended to form a joint with the bottom and sides of the shell or with each other. The cover $D^3$ is also provided on its under surface with downwardly-projecting double flanges or a recess, $k$, adapted to fit over the upper termination of the box or shell, packing $i$, and screw-bolts O, which work in suitable lugs, $o'$, forming part of the shell, the several jointing-surfaces forming a water-tight joint at the entrance to the vault when the cover is fixed thereto.

In Fig. 18, which substantially illustrates the operative arrangement of the devices which I employ for conveying and distributing service-wires overhead, a hand-hole D is shown located contiguous to the side of a building. Pipes D', connecting the same with a junction box or similar hand-hole, or, if desired, directly with a vault, B, are also shown. Vertically-arranged conveyer-pipes $D^{13}$, held in any suitable manner to the side of the building, are connected by their lower ends with the several compartments of said hand-hole in a manner similar to the manner of connecting therewith the service-pipes $D^2$, previously described.

In Figs. 3 and 6 I have illustrated the devices which I employ for hauling cables through the conduit-ducts. Anchoring-points, preferably in the form of eyebolts $h'$, which are located in the floor of the vault, are secured in position by the plates $w$. (Seen below the under line of the masonry.) A removable swiveling-sheave, H, is provided with adjustable securing devices, preferably in the form of chains $h$, the lower ends, $v$, of which are adapted to be hooked or otherwise secured to said anchoring-points. When the sheave is in operative position, with said chains of equal length, its position would be in line with the central horizontal duct or center of the vault, as shown in Fig. 3. By changing the length of all or certain of the chains, as occasion may require, it may be brought into working position before any duct, either of the horizontal or vertical series. The hauling-through cable $H^2$, which is made fast to the wire cable S, passes around the sheave and thence upwardly through the vault to the winch or other suitable winding device, H', located above ground. Each vault being provided with anchoring-points $h'$, a sheave may be employed in each one throughout such of the length of the system as it may be necessary to haul through a cable.

The operation of hauling a cable through the system by the devices above described is as follows: As the leading end of the electric cable is being drawn toward the vault next beyond its point of insertion by means of the hauling-through cable $H^2$, a similar supplemental hauling-through rope or cable, $H^3$, would be drawn through the duct simultaneously with the passage of the cable S, or by suitable appliances when the leading end of said cable S had been drawn into said vault. The following end of the supplemental rope or cable would then be made fast to the body of the cable S at the point of its entrance primarily into the duct. The hauling-through cable H² would then be passed through the proper duct to the next vault, to be passed around a sheave, and thence to a similar winding device, H', in the same manner as shown in Fig. 6. The supplemental rope or cable being then passed around the first-mentioned sheave and connected with its winding device H', the two winding devices would be operated simultaneously, thus equally dividing the hauling-through strain between the two vaults. This method of dividing up the hauling-through strain, as above described with reference to two of the vaults, is adhered to throughout the system in the work of locating cables in the conduit. The doors b', being removed from a compartment, b, into which a duct, a, (through which a cable S is being run,) enters after the cable has been run for the desired distance, (a sufficient slack being allowed thereto within the vault for the purpose required,) it is carried into said compartment to permanently occupy the position shown in Fig. 3, the doors being then replaced in position. By this means a continuity of the cable may be maintained from initial to distributing points in contradistinction to breaking and splicing the same in the several vaults through which it passes.

By the employment of the horizontal compartments b it will also be noted that the cables are so stored that access can be readily had to them; also that the general interior of the vault is entirely free from the presence of cables or wires, which in ordinary vault constructions occupy much of the working area, materially interfering with the work to be done therein.

To fully describe the manner in which wires are run from a vault B through the several other elements of the system: Single service-wires s, or those contained within a cable S, are run from their compartment b through a vertical passage, g, to its chamber G, at that point being connected with the binding-posts of a test-board L, (see Fig. 2,) if desired, passing thence through a pipe, C', into a junction-box C, located, preferably, as shown, at or about midway between streets M. At this print they are connected with binding-posts l of a test-board, thence running, Figs. 10, 11, 13, to the right or left, or in both directions, through a pipe, D', into a hand-hole D, thence certain of them being run through a pipe, D², to the required point of service, while the others pass through a continuation of said pipe system D' to the next adjacent hand-hole, from which certain of the number are similarly carried to their points of service, the remainder passing to other hand-holes.

The wires to be conveyed and distributed overhead, as shown in Fig. 18, pass through a pipe, D', into the hand-hole D, thence through a vertical pipe, $D^{13}$, from which they pass to their respective points of service within or about the buildings of the block. By thus conveying and distributing the wires overhead it will be noted that, aside from the expense avoided, which is a matter of great moment, a very great deal of annoyance incident to the work of excavating for and the underground running of service-pipes in populous or business localities is obviated.

The ladder Q (shown in Fig. 18) illustrates an ordinary fire-escape ladder provided with a stand-pipe, q, through which water is carried to the top of a building, the pipes $D^{13}$ being located contiguous thereto for the convenience afforded thereby in reaching the upper terminals of said pipes, when necessary, from the exterior of the building. The support T (also shown in Fig. 18) also indicates an ordinary rack located on top of the building, to which the wires passing from the pipes $D^{13}$ are run and fastened before passing to their destination.

It will be observed that the principle of insulating or separating respective classes of wires and cables is shown and described throughout the system—to wit, the number of vertical series of pipes A' being three, the same number of compartments b, passages g, and chambers G, are provided in the vault B, that separate pipes C' connect the same with corresponding compartments, c, of the junction-box C, which are in turn connected by separate pipe D' with corresponding compartments, d, of the hand-holes D, from which the wires likewise pass to service by means of separate pipes D²; but in cases where the character of wires within the system do not require such separation the details of construction and arrangement would be materially simplified. Thus, for illustration, if electrical conductors of but one class were to be contained within the system, but one pipe C' would need to be employed for carrying wires to the junction-box, which in turn would require but one compartment, the pipes D' connecting the same with the hand-hole, and the compartments thereof, together with the service-pipes D² therefrom, likewise being reduced to one; also in any case the pipes C' may connect directly with the compartments b, instead of through the passages g and chamber G. These and like changes of construction or arrangement are considered to be clearly within the scope and intent of my invention.

It is obvious that the pipes of an intersecting branch of the main conduit (see Fig. 1) would be connected with the vault B similarly to the manner of connection therewith of the main conduit; also that the wires conveyed overhead by the pipes $D^{13}$ may be distributed at the tops of buildings directly from said pipes instead of through the box or boxes P, the use of which is not absolutely necessary.

Having thus fully described my invention, what I claim as new, and desire to secure by Letters Patent, is—

1. In a subterranean electric-line system, the combination, with separated vertical series of conduit-pipes, of vaults B, provided interiorly with horizontally-continuous cable-compartments b, into which the terminals of said pipes open, junction-boxes C, provided with wire-compartments c, hand-holes D, provided with wire-compartments d, and pipes C' D', connecting said vault, junction-boxes, and hand-holes together, the whole being arranged and adapted to convey and distribute electric wires in the order of their classified arrangement within the conduit-pipes, substantially as set forth.

2. In a subterranean electric line-system, a vault interiorly provided with a suitable number of longitudinal cable or wire compartments formed within or about the side wall thereof, having operative connection with the conduit-main arranged and adapted to form a longitudinally-continuous passway through said vault for wires or cables contained within said main and to free the general or working interior of said vault from the presence of cables or wires which pass therethrough, substantially as described.

3. In a subterranean electric line-system, a vault interiorly provided with a suitable number of longitudinal cable or wire compartments formed within or about the side wall thereof, having operative connection with the conduit-main, a corresponding number of wire-distributing chambers, likewise formed within or about said side wall, into which a corresponding number of wire-conveying pipes enter, and a corresponding number of vertically-inclined passages connecting said compartments and chambers, substantially as and for the purpose set forth.

4. In a subterranean electric-line-system vault, the combination, with the interior cable or wire compartments, recesses, or chambers formed within or about the side wall or walls thereof, of doors provided with closing-strips adapted to close said compartments, recesses, or chambers, and to exclude from the wires or cables contained therein air or moisture which might otherwise enter thereto from the interior of the vault, and devices for securing said doors in position, substantially as set forth.

5. In cable-hauling-through devices, the combination, with hauling-through-cable-winding devices and anchoring-points suitably located or fixed within the vaults forming part of a subterranean electric-line system, of a sheave or pulley provided with devices for securing the same in position within said vault to said anchoring-points, all arranged and adapted to be operated substantially as set forth.

GEORGE W. LE VIN.

Witnesses:
HENRY FRANKFURTER,
JAMES C. COWAN.